Lawton & Bliss,
Hose Coupling.
No. 3768. Reissued Dec. 21. 1869
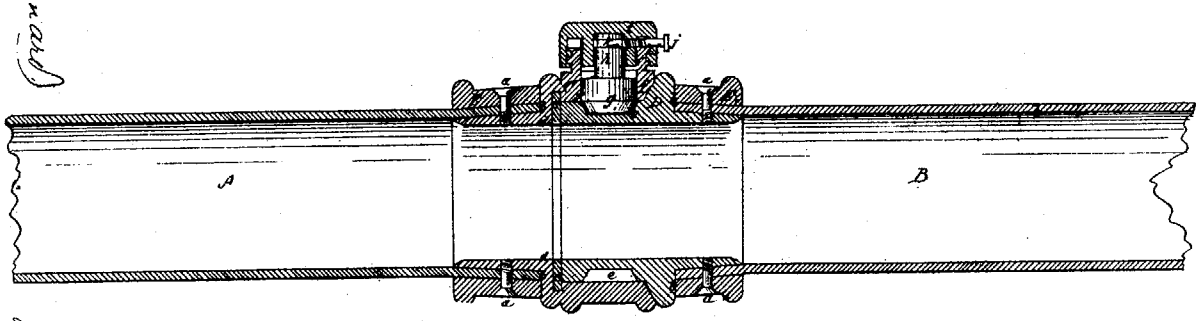
Witnesses
Charles H. Leonard
M. Witter
Inventors.
William H. Bliss

United States Patent Office.

WILLIAM H. BLISS, OF NEWPORT, RHODE ISLAND, ASSIGNEE OF HIMSELF AND ROBERT B. LAWTON.

*Letters Patent No.* 23,033, *dated February* 22, 1859; *reissue No.* 3,768, *dated December* 21, 1869.

IMPROVEMENT IN HOSE-COUPLINGS.

The Schedule referred to in these Letters Patent and making part of the same.

Be it known that ROBERT B. LAWTON and WILLIAM H. BLISS, both of Newport, county of Newport, and State of Rhode Island, did invent a new and improved Hose-Coupling; and that the following is a full, clear, and exact description of the same, reference being had to the annexed drawing, making a part of this specification; said drawing being a longitudinal central section of the invention.

The object of this invention is to connect hose together in such a manner as to secure a tight joint, and admit of their being connected and disconnected with greater facility than was previously done.

The nature of the invention consists in having a part of one of the thimbles which are to connect the ends of the hose, fitted into the other, with a circumferential groove around the inner one, having an inclined side nearest the tight joint, to be formed by the coupling, and a pin, operated longitudinally through the outer thimble and against the side of the groove, so that when the pin is moved in, it acts against the inclined side of the groove and forces the thimbles together, and secures a tight joint where the joint is to be made between the two thimbles, and when the pin is moved out, it allows the thimbles to be separated.

To enable those skilled in the art to fully understand and construct the invention, I will proceed to describe it.

A B represent the ends of two pieces of hose;

C is a metal thimble or tube, attached to the end of hose A; and

D is a thimble or tube, attached to the end of hose B.

These thimbles may be made of any suitable metal, and may be secured to the hose by metal bands, E E, which encompass the hose, and through which and the bands, and the ends of the thimbles, screws *a* pass, the ends of the hose being between the bands E E and the ends of the thimbles, as shown clearly in the drawing.

It will be seen, by referring to the drawing, that the ends of the hose A B and bands E E abut against shoulders *b* on the thimbles.

The outer portion of the thimble D, which is beyond its hose B, is smaller than the corresponding portion of the thimble C, so much so that D may fit within C, and the end of D abut against a packing or ground-seat, *c*, on a shoulder, *d*, which is formed within C, by its enlargement, it being understood that the ends of the thimbles within the hose may be equal in diameter.

The thimble D is grooved circumferentially, as shown at *e*, one side at least of the groove being bevelled or inclined, so that the outer part is wider than the inner part, and on the thimble C, a tubular flanch is made, with an opening through it, and through the thimble C.

A pin, having a rounded bevelled or chamferred inner end, is to pass through this opening into the circular groove on the thimble D. The pin is to be operated through this opening by means of a screw-connection, or in any other convenient or known way, but a screw for that purpose is preferred, so that by moving the pin inwardly, its end will come in contact with the inclined side of the groove on thimble D, and force the end within the other thimble against the shoulder on the inside of thimble C, thereby making a tight joint.

The screw-connection for operating this pin may be made by having the pin screw into the flanch, by means of a screw-thread on the pin and on the interior surface of the flanch, or by a screw-cap being attached to the pin and screwed on to the flanch.

For the purpose of allowing the pin to freely rotate when not disconnected from the thimble, and thereby preventing the same part of its end from wearing at all all times against the inclined side of the groove or thimble D, it is preferred to make the pin with the stem *h*, which passes into a cap, *i*, and is secured therein by a pin or a small screw, which passes laterally into a groove in the stem, as shown at *k*.

The stem *k* is thus allowed to turn freely within the cap *i*, and the cap *i* screws on the flanch *f*, as shown in the drawing.

But it is not intended to limit this patent to the particular means herein described of operating the pin through thimble C, as this can be varied, and the coupling still contain the invention.

It is preferred to make the end of this pin, which passes into the groove or thimble D tapering or rounded, but it is not intended to limit the patent to such formation of the end of the pin, because it is obvious that without such formation the pin could be made to act upon the inclined side of the groove, and tend to force the parts together, although not so advantageously as when tapered or rounded.

It is obvious that these pins, and their connections, may be increased in number, so that there may be one or more.

And it is also obvious, that instead of a groove in thimble D, a flanch surrounding it on the inclined side, for the pin to act against, would answer the purpose of forcing the parts together to make a tight joint, but a groove is preferred, because the metal which forms the side of the groove opposite the inclined face furnishes a bearing against the internal surface of the other thimble, and thereby prevents the thimble D from tilting.

From the above description it will be seen that by fitting the thimble D within C, and screwing down the pin against the inclined side of the groove *e*, in thimble D, the end of the pin will bear against said inclined side of the groove *e*, and force the outer end of thimble D against the packing or seat *c*, and thereby form a tight joint.

Having thus described the invention,

What is claimed as new in a hose-coupling, and desired to be secured by Letters Patent, is—

1. The combination of the two thimbles, C and D, by means of a pin, operating longitudinally through the outer thimble C, and against the inclined side of the groove in the thimble D, so that the two thimbles will be forced together by the inward movement of the pin, and be liberated by its outward movement, substantially as described.

2. The side of the groove in D nearest to the joint to be formed, or to the flanch, constructed with an incline, substantially as described.

3. The combination of the thimbles C and D, cap *i*, and pin $g_1$ when constructed and operated substantially as described.

WILLIAM H. BLISS.

Witnesse:

W. C. WITTER,

CHARLES H. LEONARD.